US009160412B2

(12) United States Patent
Gaalaas

(10) Patent No.: US 9,160,412 B2
(45) Date of Patent: Oct. 13, 2015

(54) MULTI-BIT DIGITAL SIGNAL ISOLATOR

(71) Applicant: Eric C. Gaalaas, Bedford, MA (US)

(72) Inventor: Eric C. Gaalaas, Bedford, MA (US)

(73) Assignee: ANALOG DEVICES, INC., Norwood, MA (US)

(*) Notice: Subject to any disclaimer, the term of this patent is extended or adjusted under 35 U.S.C. 154(b) by 0 days.

(21) Appl. No.: 13/904,082

(22) Filed: May 29, 2013

(65) Prior Publication Data
US 2013/0259145 A1 Oct. 3, 2013

Related U.S. Application Data

(63) Continuation of application No. 12/414,756, filed on Mar. 31, 2009, now Pat. No. 8,477,856.

(51) Int. Cl.
*H04B 1/38* (2015.01)
*H04B 3/54* (2006.01)
*H04L 25/02* (2006.01)
*H04L 25/49* (2006.01)

(52) U.S. Cl.
CPC ............ *H04B 3/542* (2013.01); *H04L 25/0266* (2013.01); *H04L 25/4917* (2013.01)

(58) Field of Classification Search
CPC ............ H04L 25/4925; H04L 25/4923; H04L 27/362; H04L 25/4906
USPC ........................................................ 375/258
See application file for complete search history.

(56) References Cited

U.S. PATENT DOCUMENTS

| 4,195,318 | A | 3/1980 | Price et al. |
| 5,398,327 | A | 3/1995 | Yoshida |
| 6,995,694 | B1* | 2/2006 | He et al. ............... 341/58 |
| 7,075,329 | B2 | 7/2006 | Chen et al. |
| 7,683,654 | B2 | 3/2010 | Chen et al. |
| 7,692,444 | B2 | 4/2010 | Chen et al. |
| 2006/0250155 | A1 | 11/2006 | Chen et al. |
| 2009/0122919 | A1* | 5/2009 | Grosskinsky .......... 375/327 |
| 2010/0134139 | A1 | 6/2010 | Chen et al. |

OTHER PUBLICATIONS

Gibson, Jerry D. The Mobile Communications Handbook Second Edition, 1999, pp. 6-14 through 6-16.*
Ozer et al. "Multiple-valued logic buses for reducing bus energy in low-power systems." IEEE Proc.-Comput. Digit. Tech., vol. 153, No. 4, Jul. 2006. pp. 270-271. Accessed online on Nov. 30, 2014.*

* cited by examiner

*Primary Examiner* — Shuwang Liu
*Assistant Examiner* — David S Huang
(74) *Attorney, Agent, or Firm* — Kenyon & Kenyon LLP

(57) ABSTRACT

The invention is directed to a multi-bit digital signal isolation system including a plurality of micro-transformers, each having a primary winding and a secondary winding, a transmitter circuit receiving a multi-bit signal and transmitting an encoded logic signal across the plurality of micro-transformers corresponding to the multi-bit signal, the primary winding of each micro-transformer receiving a signal corresponding to one of at least three possible states, and a receiver circuit receiving the encoded logic signal from the secondary windings of the plurality of transformers, decoding the encoded logic signal and reconstructing the received multi-bit signal based upon the decoded signal.

20 Claims, 9 Drawing Sheets

MULTI-BIT DIGITAL SIGNAL ISOLATOR

RELATED APPLICATIONS

This application is a continuation of U.S. application Ser. No. 12/414,756 filed Mar. 31, 2009, the disclosure of which is incorporated herein by this reference.

BACKGROUND

A digital signal isolator is a device or circuit for transmitting logic signals across a DC isolation barrier. A digital signal isolator may use optical or magnetic isolation to transmit an input signal from one side of the isolation barrier to the other. Each side of the isolation barrier may operate at different voltages, have different supply voltages and have separate, isolated ground reference voltages.

FIG. 1 illustrates a single-bit digital signal isolator manufactured by Analog Devices, Incorporated. The isolator includes edge detection circuits 101 and 103 for detecting rising and falling edges in the input signal. Edge detection circuit 101 outputs two pulses when a rising edge is detected and edge detection circuit 103 outputs a single pulse when a falling edge is detected. The output of the edge detection circuits 101 and 103 is input into an OR gate 104. The combined signals are then transferred across a micro-transformer 105. A receiver 106 then reconstructs the input signal by determining if the received signal has two pulses or one pulse.

Many applications require multi-bit communications across an isolation barrier. These needs can be accommodated by replicating the single bit isolator for as many bits as are needed. FIG. 2 illustrates a system in which three separate single-bit isolator systems 210-230 are used. Such solutions have disadvantages, however, as each single-bit isolator has its own isolator and therefore consumes a significant amount of space on an integrated circuit. Moreover, replicating the isolators for multi-bit communication requires a corresponding increase in power consumed by the isolator system.

Accordingly, there is a need for a multi-bit isolator system and method which reduces the overall footprint of the system on an integrated circuit and which reduces the amount of power consumed by the multi-bit isolator system.

DETAILED DESCRIPTION

A multi-bit signal isolation system, in accordance with an embodiment of the present invention, may include a plurality of isolators provided in a circuit system to transmit a multi-bit source signal across an isolation barrier. There may be fewer isolators than there are bits in the source signal. The system further may include a transmitter circuit receiving the source signal and transmitting an encoded signal, representative of the multi-bit signal across the isolators. The system further may include a receiver circuit receiving the encoded signal from isolators, decoding the encoded signal and reconstructing the source signal. By employing fewer isolators the system uses less power and have a smaller footprint than other designs.

Figure 1:
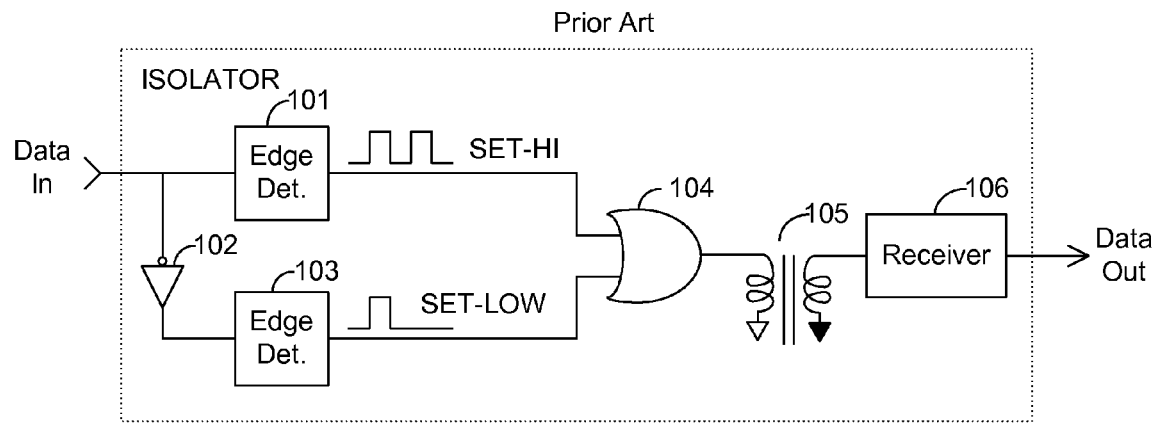
FIG. 1 illustrates a conventional single bit isolator system.
Figure 2:
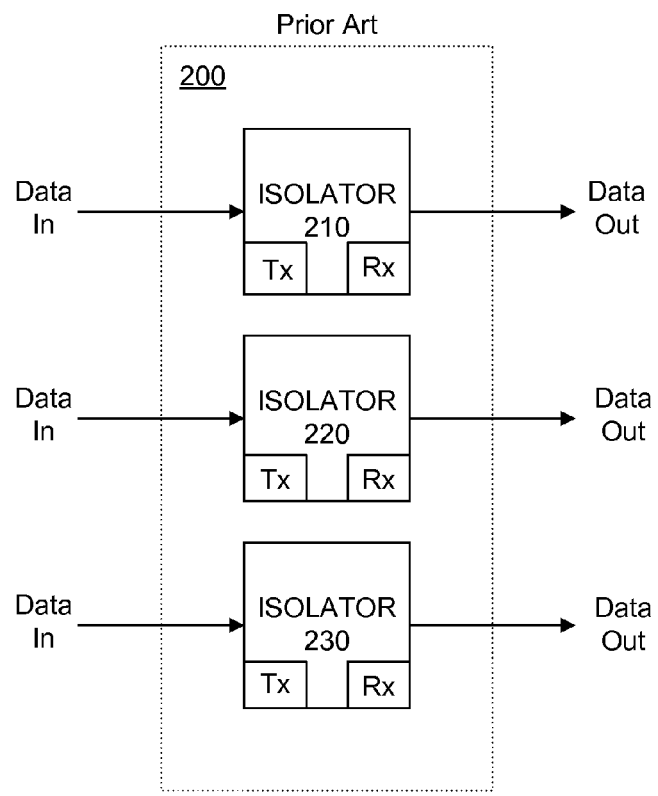
FIG. 2 illustrates a conventional multi-bit isolator system.
Figure 3:
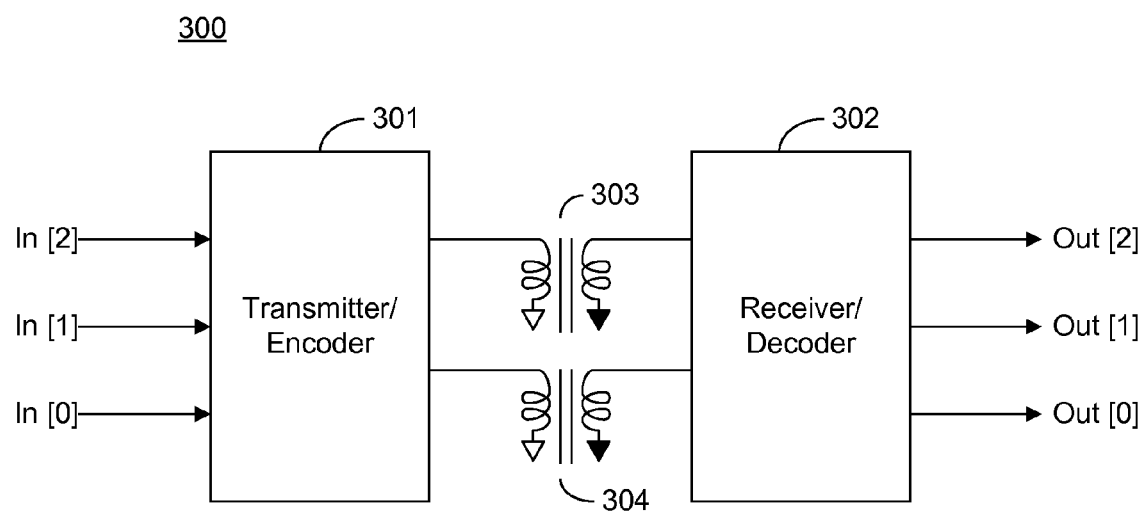
FIG. 3 illustrates an exemplary multi-bit isolator according to one embodiment of the present invention.

An exemplary embodiment of a multi-bit digital signal isolator 300 can be seen in FIG. 3. FIG. 3 illustrates a three-bit digital signal isolator 300 including a transmitter/encoding circuit 301 coupled to a receiver/decoding circuit 302 through isolators 303 and 304. The transmitter/encoding circuit 301 and the receiver/decoding circuit may be galvanically isolated from each other. The transmitter/encoding circuit 301 may receive a source signal, for example, a three-bit input signal In [2:0] and transmits an encoded signal representative of the source signal across the isolators 303 and 304. The receiver/decoding circuit 302 decodes the signals received from isolators 303 and 304, reconstructs the source signal and outputs the reconstructed source signal as a three-bit output signal Out [2:0]. In this embodiment, only two isolation channels (i.e., isolators 303 and 304) are needed to transmit a three bit signal, thereby reducing the footprint and the amount of power used by the isolator system, relative to the design illustrated in FIG. 2.

While FIG. 3 illustrates one embodiment of the present invention using micro-transformers, any type of isolator may be used including, optical isolators, magneto-resistive sensors, capacitive isolators and other types of coil- or transformer-based isolators.

Micro-transformers are formed in, partially in, or on, a semiconductor substrate of flat, parallel conductive windings and have no magnetic core. These transformers are also referred to as "air-core" transformers though there actually can be more than air between the windings, typically one or more layers of dielectric materials. This genus of digital isolators shows dramatic improvements over traditional optical isolators in terms of speed, power, edge symmetry and cost.

Optical isolators, for example, present certain well-known limitations, they require significant space on a card or circuit board, they draw a large current, they do not operate well at high frequencies, and they are very inefficient. However, by using the encoding/decoding scheme of the present invention, fewer optical isolators will be used, thus reducing the space required and reducing the power consumed by the isolator system.

While the multi-bit digital signal isolator illustrated in FIG. 3 is a three-bit isolator using two channels, the principles of the present invention may be extended to high numbers of channels as desired.

An exemplary encoding/decoding scheme for a three-bit digital signal isolator can be seen in Table 1.

TABLE 1

| Input/Output Multi-Bit Signal In/Out [2:0] | Signal Transmitted Across Isolators [303, 304] |
|---|---|
| 000 | p1, p1 |
| 001 | p1, p2 |
| 010 | p2, p1 |
| 011 | p2, p2 |
| 100 | p1, p0 |
| 101 | p0, p2 |
| 110 | p0, p1 |
| 111 | p2, p0 |

As seen in the Table 1, the transmitter/encoding circuit 301 transmits one of three signals p0, p1 or p2 across the isolators. In one embodiment, p0 may represent zero pulses being transferred across an isolator, p1 may represent one pulse being transferred across an isolator and p2 may represent two pulses being transferred across an isolator. In this exemplary encoding scheme at least one of the transformers will always be transmitting an active signal (non zero), either p1 or p2, across one of the micro-transformers 303 and 304, accordingly, the receiving circuit will detect activity and therefore will determine when data is being transferred. Further, this encoding system maximizes the use of the p0 signal. While the encoding scheme may be any arbitrary encoding scheme, maximizing the use of the p0 signal, which does not transfer any pulses, decreases the amount of energy used by the isolator system, thereby improving its efficiency.

An exemplary encoding/decoding scheme for a four-bit digital signal isolator using a combination three possible signals can be seen in Table 2.

TABLE 2

| Input/Output Multi-Bit Signal In/Out [3:0] | Signal Transmitted Across Isolators [2:0] |
|---|---|
| 0000 | p1, p1, p1 |
| 0001 | p1, p1, p2 |
| 0010 | p1, p2, p1 |
| 0011 | p1, p2, p2 |
| 0100 | p2, p1, p1 |
| 0101 | p2, p1, p2 |
| 0110 | p2, p2, p1 |
| 0111 | p2, p2, p2 |
| 1000 | p0, p1, p1 |
| 1001 | p0, p1, p2 |
| 1010 | p0, p2, p1 |
| 1011 | p0, p2, p2 |
| 1100 | p1, p0, p1 |
| 1101 | p1, p0, p2 |
| 1110 | p2, p0, p1 |
| 1111 | p2, p0, p2 |

As seen in the exemplary encoding scheme of Table 2, the transmitter/encoding circuit transmits one of three signals p0, p1 or p2 across the isolators. The 4-bit input signal has $2^4=16$ possible values, and therefore a coding scheme with at least 16 signal combinations is required to uniquely identify each possible input value. This embodiment uses 3 isolator channels with 3 possible code values per channel, giving $3^3=27$ possible signal combinations for the 3-channel system, meeting the requirement of at least 16 combinations. Since the receiver may be required to receive at least one active signal to indicate that data is present along the isolators, when one of the possible signals is an non-active signal, such as p[0] in the example above, there would only be 26 possible combinations ($3^3-1$) since the receiver circuit would not recognize a p0, p0, p0 input. Alternatively, if there were five possible code values per isolator channel, only two isolator channels would be needed in the system since there would be 31 possible combinations ($2^5-1$) available to represent $2^4=16$ input values.

Other encoding/decoding schemes may be used consistent with the present invention. Further, other types of signal may be used for the encoding/decoding scheme. For example, the plurality of signals may vary by a number of pulses, by frequency, by amplitude, by polarity, by length and/or other distinguishing characteristics that are distinguishable at the receiver. Accordingly, by using an encoding/decoding scheme with more than two possible values per isolator channel, fewer channels can be used, thereby reducing the isolator system's footprint on the substrate. Also, the overall amount of power consumed by the isolator system is possibly reduced, depending upon the details of the coding scheme.

Another embodiment of the present invention may use an encoding scheme without reducing the number of channels in the multi bit digital isolator system. By using an encoding scheme which maximizes the use of the p0 signal, the overall power consumed by the multi-bit digital isolator system may be reduced since fewer pulses would be transferred across the channels. Table 3 illustrates a two-bit encoding scheme using two channels and three possible signals.

TABLE 3

| Input/Output Multi-Bit Signal In/Out [1:0] | Signal Transmitted Across Isolators [1:0] |
|---|---|
| 00 | p0, p1 |
| 01 | p0, p2 |
| 10 | p1, p0 |
| 11 | p2, p0 |

Figure 4:
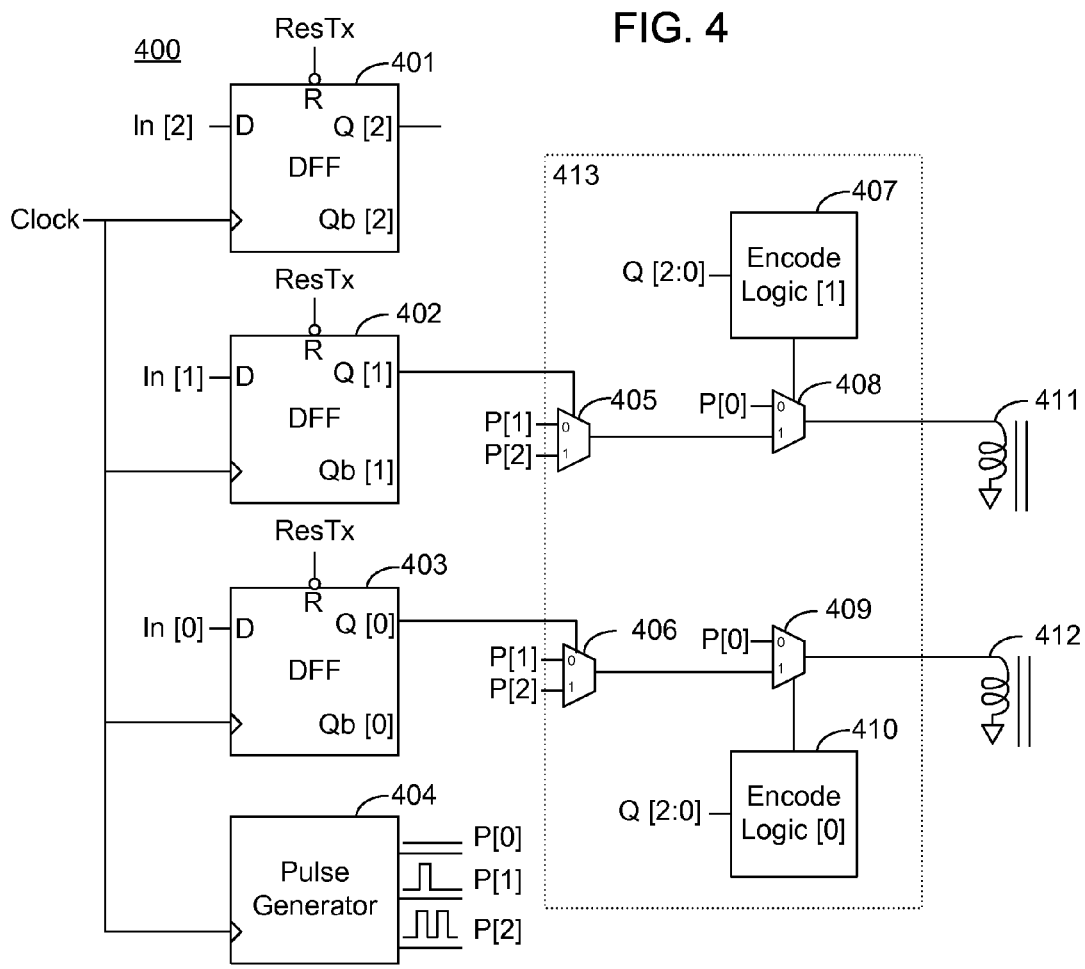
FIG. 4 illustrates a transmitter/encoder circuit according to one embodiment of the present invention.

An exemplary embodiment of a transmitter/encoding circuit 400 can be seen in FIG. 4. FIG. 4 illustrates a plurality of flip-flops 401, 402 and 403 each receiving one bit of a multi-bit input signal. Each flip-flop 401-403 also receives a common reset signal ResTx and a common clock signal. The output of the flip-flops Q[2:0] is sent to the encoding circuitry 413.

The encoding circuitry 413 will vary depending upon the encoding scheme used. The encoding circuitry 413 seen in FIG. 4 corresponds to the encoding scheme illustrated in Table 1. The encoding circuitry includes a plurality of multiplexers 405, 406, 408 and 409. Multiplexers 405 and 406 receive input signals p[1] and p[2] from pulse generator 404. The output of multiplexer 405 is controlled by the output of flip-flop 402, while the output of multiplexer 406 is controlled by the output of flip-flop 403. Multiplexer 408 receives input pulse p[0] from pulse generator 404 and receives the output of multiplexer 405. Multiplexer 409 also receives input pulse p[0] from pulse generator 404 and receives the output of multiplexer 406. The output of multiplexers 408 and 409 is selected by encode logic circuits 407 and 410, respectively. The encode logic circuits 407 and 410 determine which signals are sent to the primary windings of transformers 411 and 412.

Figure 5A:
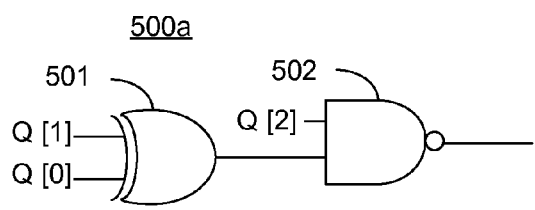
FIG. 5A illustrates a encode logic circuit in accordance with one embodiment of the present invention.
Figure 5B:
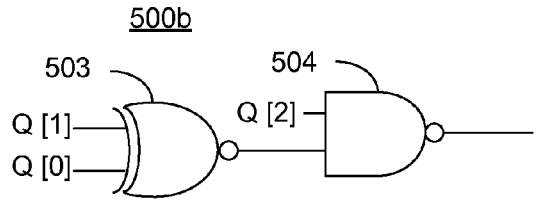
FIG. 5B illustrates another encode logic circuit in accordance with one embodiment of the present invention.

Exemplary encode logic circuits 500a and 500b are illustrated in FIGS. 5A and 5B, respectively. Encode logic circuit 500a, corresponding to Encode logic circuit 407 in FIG. 4, includes a XOR gate 501 and a NAND gate 502. XOR gate 501 receives the output Q[1] and Q[0] of flip-flips 402 and 403, respectively. NAND gate 502 receives the output of XOR gate 501 and the output Q[2] of flip-flop 401. Encode logic circuit 500b, corresponding to Encode logic circuit 410 in FIG. 4, includes a XNOR gate 503 and a NAND gate 504. XNOR gate 503 receives the output Q[1] and Q[0] of flip-flips 402 and 403, respectively. NAND gate 504 receives the output of XNOR gate 503 and the output Q[2] of flip-flop 401.

The encode logic circuits 500a and 500b seen in FIG. 5 correspond to the encoding scheme illustrated in Table 1, but will vary depending upon the encoding scheme used and the number of bits in the input signal.

Figure 6:
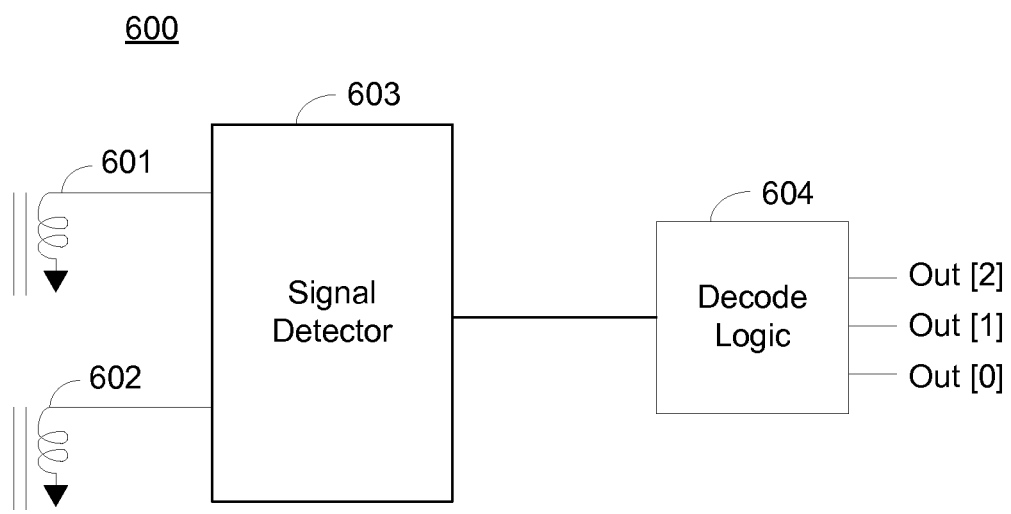
FIG. 6 illustrates a receiver/decoder circuit according to one embodiment of the present invention.

FIG. 6 illustrates an exemplary embodiment of a receiver/decoder circuit 600 for a three-bit digital signal isolator system. The signals transmitted from the transmitter/encoder circuit are received by the secondary windings of transformers 601 and 602. The signals received by the secondary windings 601 and 602 may be transmitted to a signal detector circuit 603, which may detect when a signal is received by secondary windings 601 and 602. The signal detector circuit may output other signals to a decode logic circuit 604 which reconstructs the input signal based upon the output of the signal detector circuit.

Figure 7:
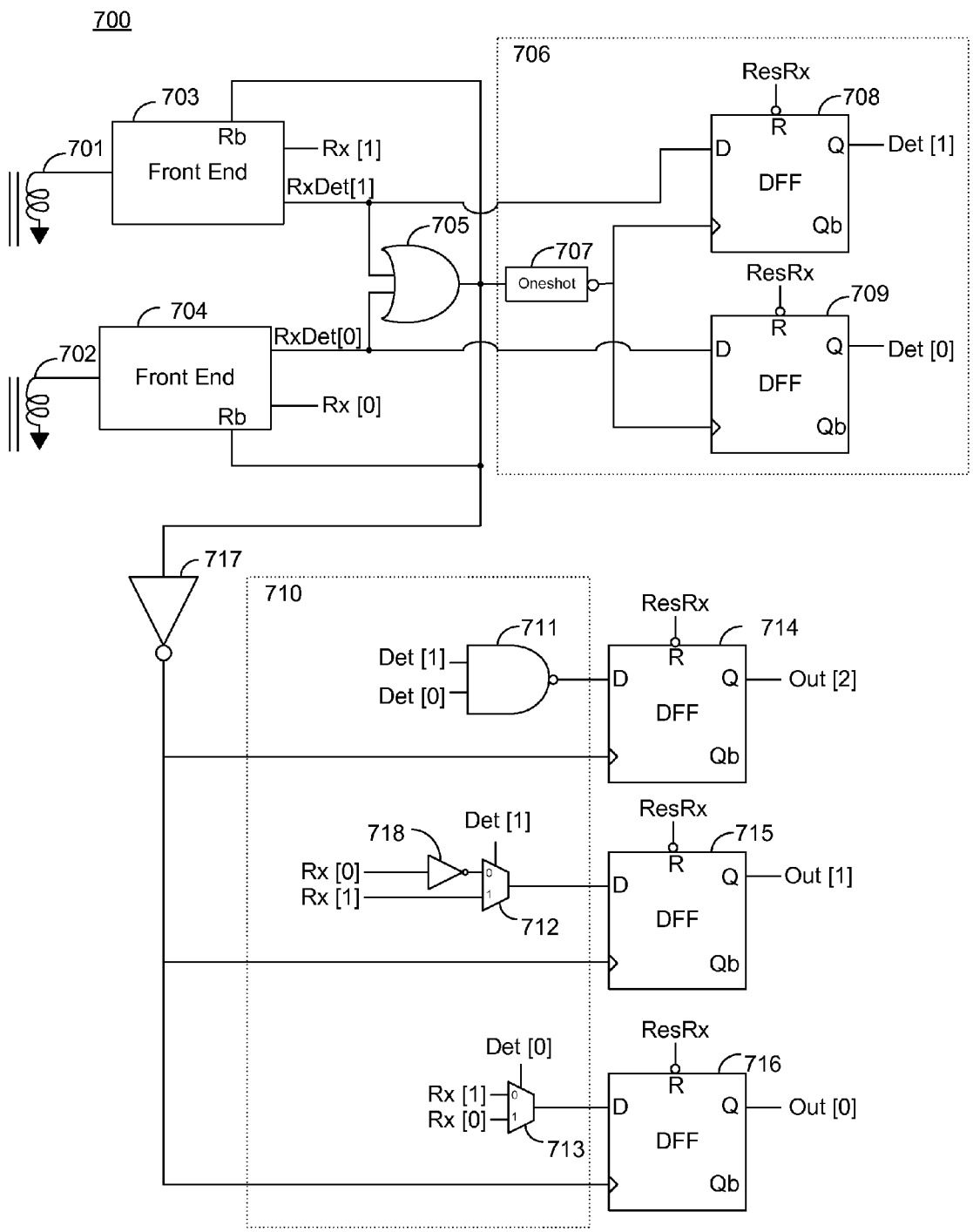
FIG. 7 illustrates another receiver/decoder circuit according to one embodiment of the present invention.

FIG. 7 illustrates yet another exemplary embodiment of a receiver/decoder circuit 700 for a three-bit digital signal isolator system. The pulses transmitted from the transmitter/encoder circuit are received by the secondary windings of transformers 701 and 702. The signals received by the secondary windings 701 and 702 are transmitted to front end systems 703 and 704, respectively. The front end systems 703 and 704 pass output signals RxDet[1:0] to the third-state detection circuit 706. Output signals RxDet[1:0] are transmitted to the data input gate of flip-flops 708 and 709 respectively. The output signals RxDet[1:0] are also transmitted to OR gate 705. The output of OR gate 705 is sent to Oneshot circuit 707.

Figure 8:
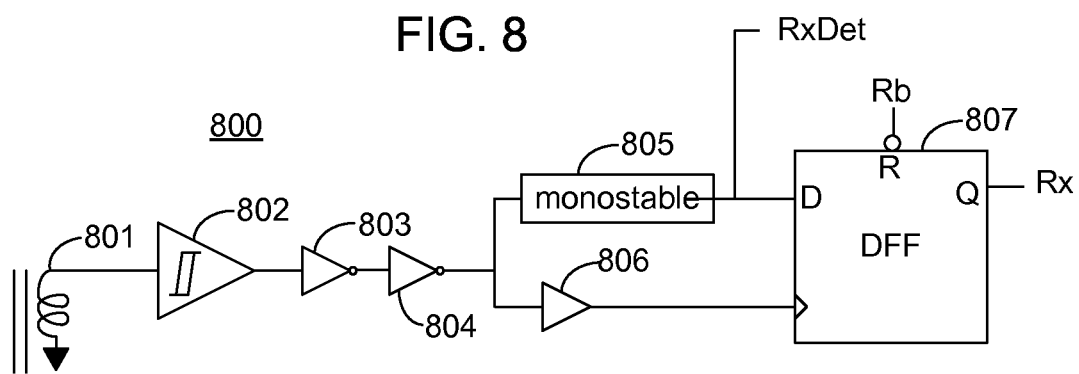
FIG. 8 illustrates a front end circuit in accordance with one aspect of the present invention.

An exemplary front end system can be seen in FIG. 8. The front end system 800 receives a input signal from secondary winding 801. The input signal is transmitted to a Schmitt trigger 802 to detect when a pulse has been transmitted, although other types of comparators can be used. The output of the Schmitt trigger 802 passes through buffers 803 and 804 before being transmitted to a monostable pulse generator 805. The output RxDet of the monostable pulse generator 805 is input to flip-flop 807 and passed out to the third-state detection circuit 706. The output from the buffers 803 and 804 are also passed though buffer 806 which is then used to clock flip-flop 807. The output Rx of flip-flop 807 is passed to the decoding logic circuit 710.

Figure 9A:
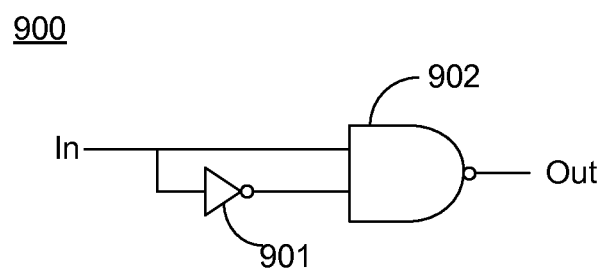
FIG. 9A illustrates a oneshot circuit in accordance with one aspect of the present invention.
Figure 9B:
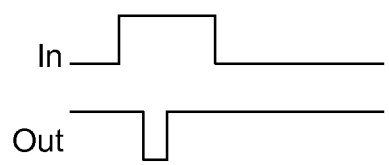
FIG. 9B illustrates an exemplary timing diagram of the oneshot illustrated in FIG. 9A.

An exemplary embodiment of a oneshot circuit 900 can be seen in FIG. 9A. FIG. 9A illustrates an inverter 901 and a NAND gate 902. The input signal to the oneshot circuit 900 is fed into both the inverter 901 and into a first input of NAND gate 902. The output of inverter 901, which merely delays and inverts the signal, is then fed into a second input of NAND gate 902. FIG. 9B illustrates an exemplary timing diagram of the oneshot circuit illustrated in FIG. 9A. As seen in FIG. 9B, only when both the input signal and the output of inverter 901 are high, the NAND gate outputs a low signal.

The output of the one shot circuit 707 is used to clock flip-flops 708 and 709. The output Det[1:0] of flip-flops 708 and 709 is then transmitted to the decode logic circuit 710. The front end systems 803 and 804 also pass signals Rx[1:0] to the decode logic circuit 810.

The decode logic circuit 710 includes NAND gate 711 which drives the input to flip-flop 714, and multiplexers 712 and invertors 718 which drive the inputs for flip-flips 715, and multiplexer 713 which drives the input to flip-flip 716. The output of OR gate 705 is inverted by inverter 717 whose output clocks flip-flops 714, 715 and 716.

The reset input of flip-flops 714, 715 and 716 of the decode logic circuit 710 and 708 and 709 of the third-state detection circuit 706 are all connected to a common reset signal ResRx.

Figure 10:
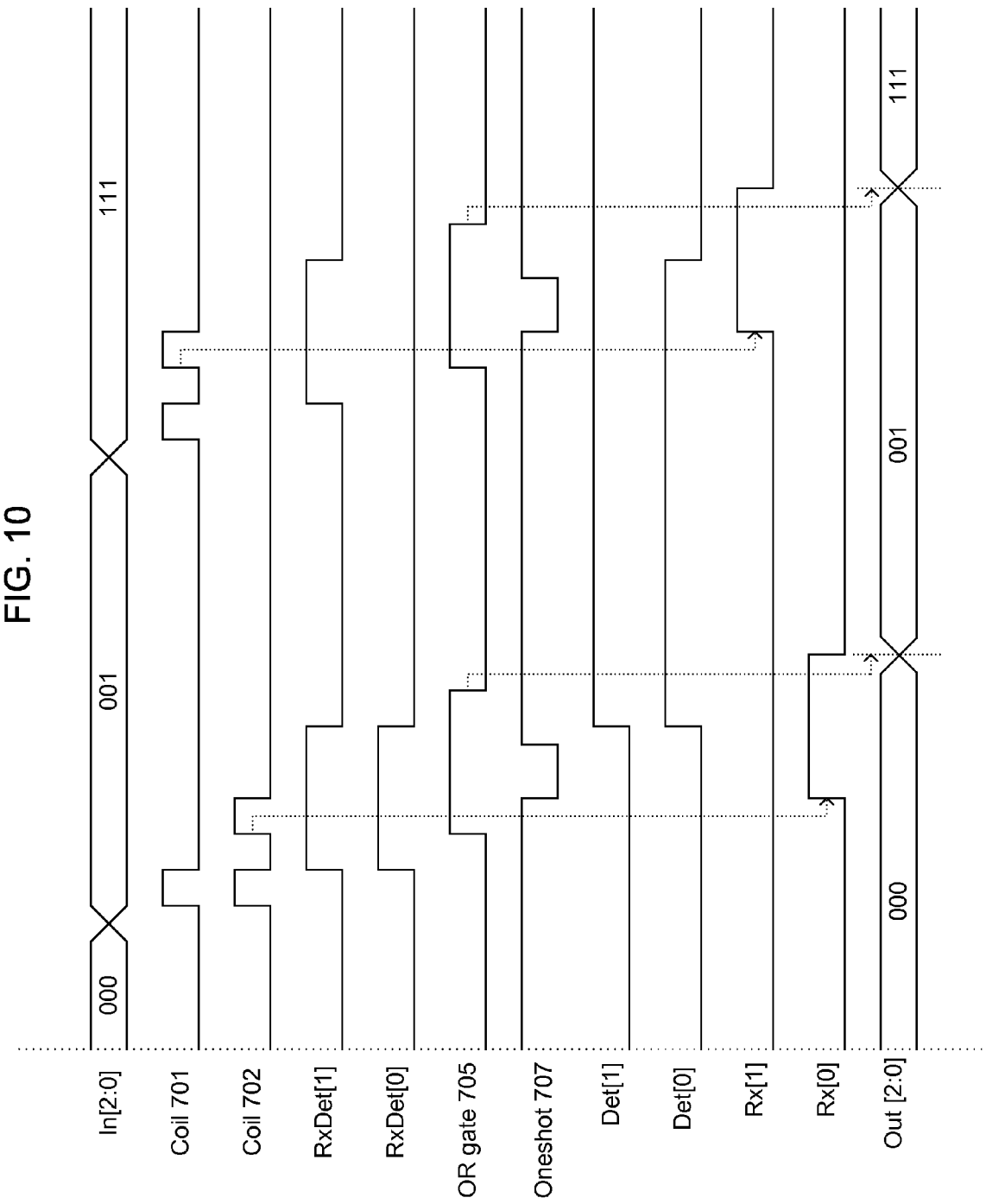
FIG. 10 illustrates an exemplary timing diagram in accordance with one aspect of the present invention.

FIG. 10 illustrates an exemplary signal timing diagram of a multi-bit isolator system using the transmitter/encoding circuit seen in FIG. 4 and the receiver/decoding circuit seen in FIG. 7. The input signal In[2:0]=001, according to the encoding/decoding scheme in Table 1, will cause signals p[1] & p[2] to be transmitted across the primary windings of the isolators 411 and 412. Because the input signal In[2:0] is 001 the output of flip-flops 401-403 Q[2:0] will be 001 when the flip-flops are clocked. The output Q[1] of flip-flop 402 is 0, accordingly signal p[1] will be selected to be transmitted through multiplexer 405. The output Q[0] of flip-flop 403 is 1, accordingly signal p[2] will be selected to be transmitted through multiplexer 405. Further, encode logic circuits 407 and 410 will both output a 1 in this scenario. Accordingly, the encoding circuitry 413 will cause signals p[1] and p[2] to be transmitted across the primary windings of isolators 411 and 412.

As seen in FIG. 10, the secondary windings 701 and 702 of the micro transformers will initially receive signals p[1] and p[2], respectively. Since both coils received active signals (non-zero signals) the monostable pulse generators of front ends will both output high signals (RxDet[1:0] will be 11), as seen in FIG. 10. Since at least one of the output signals RxDet[1:0] from the monostable pulse generators (in this case both) was high, the output of OR gate 705 will be high further causing the oneshot circuit 707 to emit a pulse, which in turn, will clock flip-flops 708 and 709. Since RxDet[1:0] was 11, the output Det[1:0] of the flips-flops 708 and 709 will be also 11 when the flip-flops 708 and 709 are clocked.

Further, as seen in FIG. 10, the second pulse received on the secondary winding 702 will cause the output Rx[0] of front end circuit 704 to be 1. On the falling edge of the output of OR gate 705, which is inverted by inverter 717 and used to clock-flip-flops 714-716, the decode logic circuit 710 will decode the received signals and the output signal out[2:0] becomes 001, thus matching the input signal.

As seen in FIG. 10, when the input signal In[2:0] switches to 111, the transmitter/encoding circuit transmits two pulses (signal p[2]) across coil 701 and zero pulses (signal p[0]) across coil 702. Since only coil 701 received active signal (non-zero signal) only the monostable pulse generators of front end 703 will output a high signal (RxDet[1:0] will be 10), as seen in FIG. 10. Since at least one of the output signals RxDet[1:0] from the monostable pulse generators was high, the output of OR gate 705 will be high further causing the oneshot circuit 707 to emit a pulse, which in turn, will clock flip-flops 708 and 709. Since RxDet[1:0] was 10, the output Det[1:0] of the flips-flops 708 and 709 will be also 10 when the flip-flops 708 and 709 are clocked.

Further, as seen in FIG. 10, the second pulse received on the secondary winding 701 will cause the output Rx[1] of front end circuit 703 to be 1. On the falling edge of the output of OR gate 705, which is inverted by inverter 717 and used to clock-flip-flops 714-716, the decode logic circuit 710 will decode the received signals and the output signal out[2:0] becomes 111, thus matching the input signal.

Figure 11:
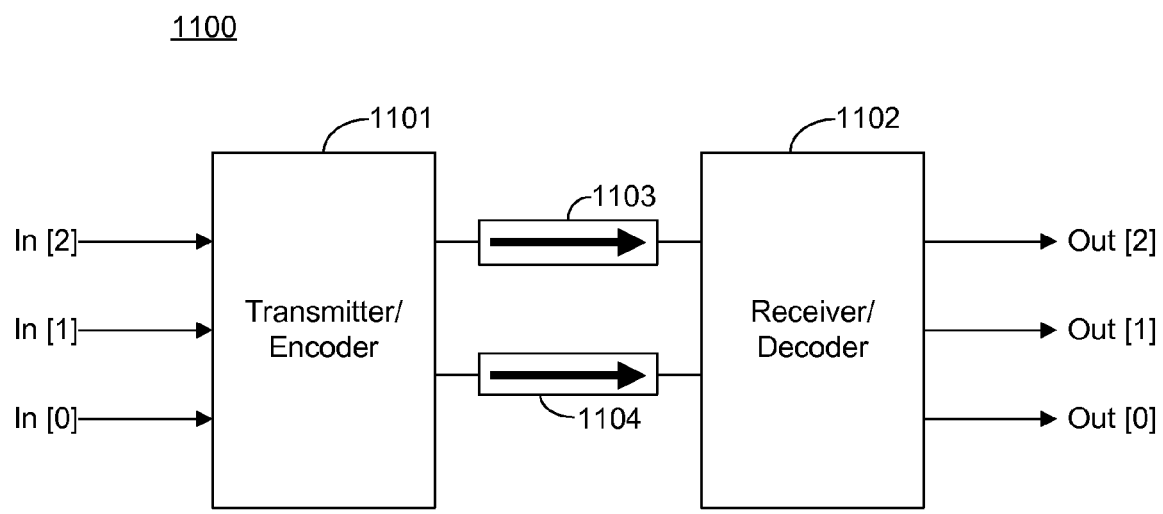
FIG. 11 illustrates another exemplary multi-bit isolator according to one embodiment of the present invention.

FIG. 11 illustrates a three-bit digital signal isolator 1100 including a transmitter/encoding circuit 1101 coupled to a receiver/decoding circuit 1102 through isolators 1103 and 1104.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A multi-bit isolation system, comprising:
a plurality of isolation channels, each to transmit a respective signal in parallel across a galvanic isolation barrier;
a transmitter circuit, provided on a first side of the galvanic isolation barrier and having outputs coupled to the respective isolation channels, the transmitter circuit receives a multi-bit input signal and provides a multi-symbol output signal to the outputs in parallel representing the input signal, one symbol to each output, and each symbol having one of at least three possible states; and
a receiver circuit provided on a second side of the galvanic isolation barrier and having inputs coupled to the isolation channels, the receiver circuit decoding the received multi-symbol output signal and providing a reconstructed multi-bit input signal, wherein the receiver interprets a non-active state over an isolation channel as a symbol of the received multi-symbol output signal only by examining, while the non-active state is present over the isolation channel, a state of at least one other parallel isolation channel to determine if the at least one other parallel isolation channel is switching actively during the parallel transmission, wherein the receiver circuit interprets the non-active state over an isolation channel as an idle channel bearing no symbol if every other parallel isolation channel is non-active while the non-active state is present over the isolation channel.

2. The multi-bit isolation system of claim 1, wherein one of the states generates zero activity in the isolation channel.

3. The multi-bit isolation system of claim 2, wherein the possible states include a signal with a rising edge and a signal with a falling edge.

4. The multi-bit isolation system of claim 2, wherein the possible states include a pulse with a first nonzero amplitude and a pulse with a second nonzero amplitude.

5. The multi-bit isolation system of claim 2, wherein the possible states include an oscillation with a first nonzero frequency and an oscillation with a second nonzero frequency.

6. The multi-bit isolation system of claim 1, wherein a number of isolation channels is fewer than a number of bits in the multi-bit input signal.

7. The multi-bit isolation system of claim 1, wherein each isolation channel includes a transformer having a primary winding on the first side of the galvanic isolation barrier and a secondary winding on the second side of the galvanic isolation barrier.

8. The multi-bit isolation system of claim 1, wherein the transmitter circuit includes a pulse generator generating the symbols for the multi-symbol output signal.

9. The multi-bit isolation system of claim 8, wherein the transmitter circuit further includes an encoding circuitry determining which of the symbols from the pulse generator to transmit across each of the isolation channels.

10. The multi-bit isolation system of claim 1, wherein the three possible states include a signal with zero pulses, a signal with one pulse and a signal with two pulses.

11. The multi-bit isolation system of claim 1, wherein the three possible states include a signal with zero activity, and signals that differ by polarity.

12. A method of transmitting multi-bit signals across a digital signal isolator system, comprising:
receiving an input multi-bit word;
developing a multi-symbol output signal corresponding to the input multi-bit word;
transmitting the multi-symbol output signal in parallel across a plurality of isolation channels forming a galvanic isolation barrier, one symbol of the multi-symbol output signal transmitted across each of the plurality of isolation channels and each channel receiving a symbol corresponding to one of at least three possible states;
decoding the received multi-symbol output signal;
reconstructing a received multi-bit word based upon the decoded multi-symbol output signal;
interpreting a non-active state over an isolation channel as a symbol of the received multi-symbol output signal only by examining, while the non-active state is present over the isolation channel, a state of at least one other parallel isolation channel to determine if at least one other isolation channel is switching actively during the parallel transmission; and
interpreting the non-active state over an isolation channel as an idle channel bearing no symbol if every other parallel isolation channel is non-active while the non-active state is present over the isolation channel.

13. The method of claim 12, wherein the symbols for the multi-symbol output signal are generated by a pulse generator.

14. The multi-bit isolation system of claim 12, wherein one of the states generates zero activity in the isolation channel.

15. The multi-bit isolation system of claim 14, wherein the possible states include a signal with a rising edge and a signal with a falling edge.

16. The multi-bit isolation system of claim 14, wherein the possible states include a pulse with a first nonzero amplitude and a pulse with a second nonzero amplitude.

17. The multi-bit isolation system of claim 14, wherein the possible states include an oscillation with a first nonzero frequency and an oscillation with a second nonzero frequency.

18. The method of claim 12, wherein the three possible states include a signal with zero pulses, a signal with one pulse and a signal with two pulses.

19. The method of claim 12, wherein the three possible states include a signal with zero activity, and signals that differ by polarity.

20. The method of claim 12, wherein each isolation channel includes a transformer having a primary winding on the first side of the galvanic isolation barrier and a secondary winding on the second side of the galvanic isolation barrier.

* * * * *